United States Patent
Greene et al.

(10) Patent No.: US 6,246,759 B1
(45) Date of Patent: *Jun. 12, 2001

(54) CALL OVERFLOW SYSTEM AND METHOD FOR OVERFLOWING TELEPHONE CALLS BETWEEN TELEPHONIC SWITCHES

(75) Inventors: Daniel L. Greene, Aurora; Chan-En Li, Naperville; Doug Gisby, Lincolnshire, all of IL (US)

(73) Assignee: Rockwell International Corporation, Milwaukee, WI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/721,791

(22) Filed: Sep. 26, 1996

(51) Int. Cl.[7] .............................. H04M 3/42; H04M 3/00
(52) U.S. Cl. .................... 379/265; 379/212; 379/260; 379/273; 379/309
(58) Field of Search ................................ 379/67, 88, 89, 379/67.1, 265, 88.01, 210, 267, 212, 211, 260, 261, 262, 263, 264, 266, 273, 309, 308

(56) References Cited

U.S. PATENT DOCUMENTS

| | | | |
|---|---|---|---|
| 4,757,525 | * 7/1988 | Matthews et al. | 379/89 |
| 5,036,535 | * 7/1991 | Gechter et al. | 379/210 |
| 5,271,058 | * 12/1993 | Andrews et al. | 379/210 |
| 5,274,700 | * 12/1993 | Gechter et al. | 379/210 |
| 5,291,551 | * 3/1994 | Conn et al. | 379/265 |
| 5,384,841 | * 1/1995 | Adams et al. | 379/266 |
| 5,467,390 | * 11/1995 | Brankley et al. | 379/229 |
| 5,469,504 | * 11/1995 | Blaha | 379/265 |
| 5,479,487 | * 12/1995 | Hammond | 379/67.1 |
| 5,530,744 | * 6/1996 | Charalambous et al. | 379/201 |
| 5,555,299 | * 9/1996 | Maloney et al. | 379/212 |
| 5,684,870 | * 11/1997 | Maloney et al. | 379/212 |
| 5,696,809 | * 12/1997 | Voit | 379/5 |
| 5,703,943 | * 12/1997 | Otto | 379/265 |
| 5,724,419 | * 3/1998 | Harbuziuk et al. | 379/265 |
| 5,757,904 | * 5/1998 | Anderson | 379/265 |
| 5,923,745 | * 7/1999 | Hurd | 379/220 |
| 5,937,051 | * 8/1999 | Hurd et al. | 379/212 |
| 5,970,132 | * 10/1999 | Brady | 379/212 |
| 5,970,135 | * 10/1999 | Lenihan et al. | 379/266 |

* cited by examiner

Primary Examiner—Fan Tsang
Assistant Examiner—Allan Hoosain
(74) Attorney, Agent, or Firm—Welsh & Katz, Ltd.

(57) ABSTRACT

A call overflow system 10 and method for overflowing telephone calls from an originating telephonic switch 12A and a destination telephonic switch 12B is provided. An information element data packet 34 containing information relating to the telephone calls is transmitted between the originating telephonic switch 12A and the destination telephonic switch 12B. The data packet 34 comprises information provided by a caller in byte (20b) 80, designated switch status data. The information is thereafter utilized by the destination telephonic switch 12B to route the telephone calls to internal telephonic units 20B for service.

22 Claims, 3 Drawing Sheets

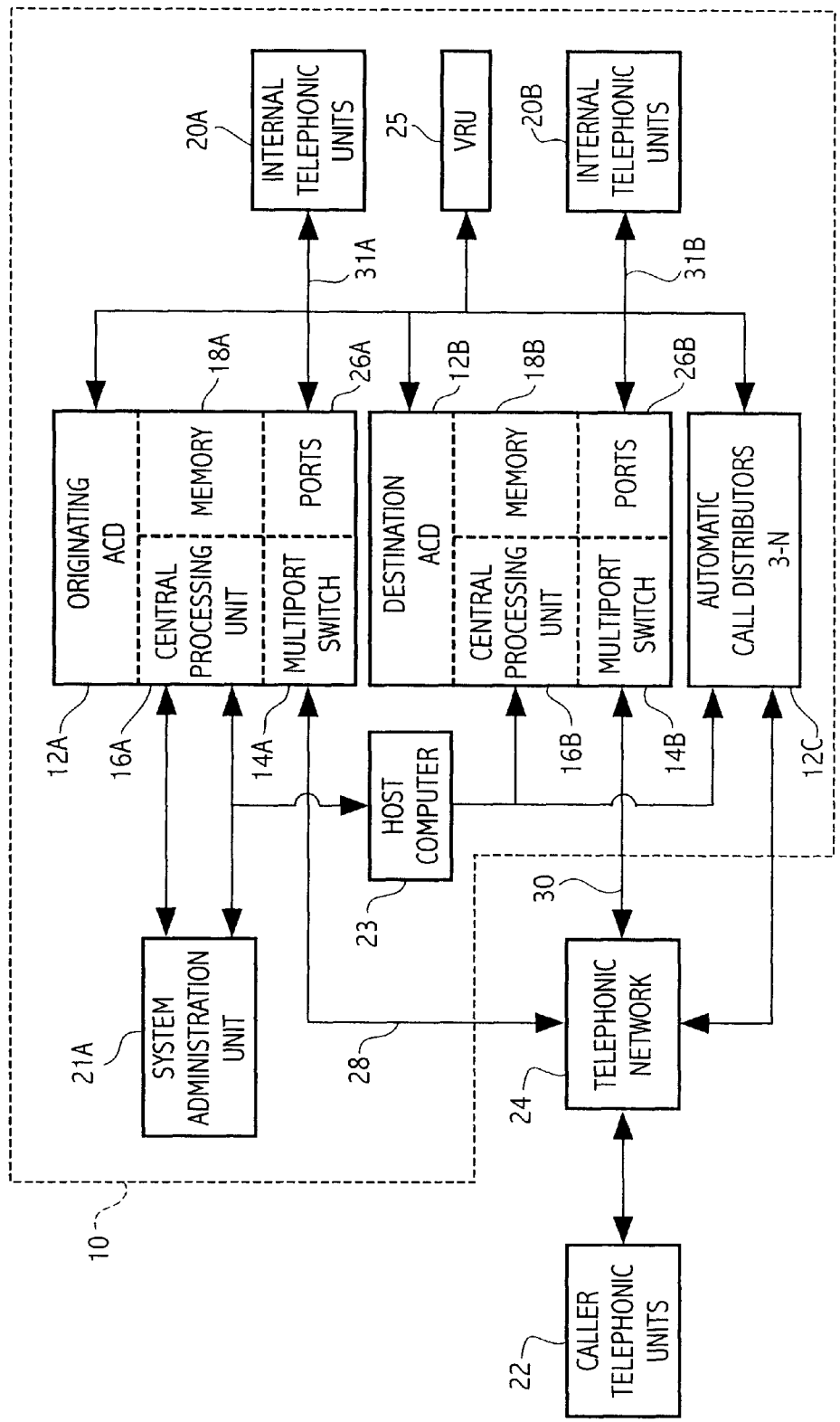

FIG. 2A

| OCTET \ BITS | 8 | 7 | 6 | 5 | 4 | 3 | 2 | 1 | |
|---|---|---|---|---|---|---|---|---|---|
| 1 | USER-TO-USER IDENTIFIER ELEMENT | | | | | | | | 36 |
| 2 | LENGTH OF USER-TO-USER IDENTIFIER ELEMEMENT | | | | | | | | 38 |
| 3 | ISDN OVERFLOW IDENTIFIER ELEMENT | | | | | | | | 40 |
| 4 | DESTINATION APPLICATION NUMBER | | | | | | | | 42 |
| 5 | DELAY IN QUEUE AT ORIGINATING SWITCH (LEAST SIGNIFICANT BYTE) | | | | | | | | 44 |
| 6 | DELAY IN QUEUE AT ORIGINATING SWITCH (MOST SIGNIFICANT BYTE) | | | | | | | | 45 |
| 7 | NUMBER OF DNIS DIGITS | | | | | | | | 46 |
| 7a | DNIS BCD DIGIT 1 (46A) | | | | DNIS BCD DIGIT 2 (46B) | | | | |
| 7b | DNIS BCD DIGIT 3 (46C) | | | | DNIS BCD DIGIT 4 (46D) | | | | |
| 8 | NUMBER OF ANI DIGITS | | | | | | | | 48 |
| 8a | ANI BCD DIGIT 1 (50A) | | | | ANI BCD DIGIT 2 (50B) | | | | |
| 8b | ANI BCD DIGIT 3 (50C) | | | | ANI BCD DIGIT 4 (50D) | | | | |
| 8c | ANI BCD DIGIT 5 (50E) | | | | ANI BCD DIGIT 6 (50F) | | | | |
| 8d | ANI BCD DIGIT 7 (50G) | | | | ANI BCD DIGIT 8 (50H) | | | | |
| 8e | ANI BCD DIGIT 9 (50I) | | | | ANI BCD DIGIT 10 (50J) | | | | |
| 9 | ORIGINATING ACD SWITCH ID | | | | | | | | 52 |

CALL OVERFLOW SYSTEM AND METHOD FOR OVERFLOWING TELEPHONE CALLS BETWEEN TELEPHONIC SWITCHES

BACKGROUND OF THE INVENTION

This invention relates generally to telephonic switching networks comprised of a plurality of interconnected telephonic switches and, more particularly, to a call overflow system and method for transferring calls from an originating telephonic switch to a destination telephonic switch, for compiling data relating to the calls at the originating telephonic switch including information supplied by the caller and for transmitting the data to the destination telephonic switch.

Telephonic switches employing a multiport switch controlled by a central processing unit for selectively interconnecting a plurality of interior telephonic units with external telephonic units through an external telephonic network are well known. It is also known to send an external telephonic call received at a telephonic switch to another telephonic switch in a telephonic switch network. An example of such a telephonic switch is disclosed in U.S. Pat. No. 5,469,504 issued to Blaha on Nov. 21, 1995 and entitled "Automatic Call Distributor With Intersubnetwork Customer Information Transfer System and Method", the disclosure of which is hereby incorporated by reference.

In these known systems, an incoming telephone call is made from an external telephonic unit to an originating telephonic switch, such as an automatic call distributor (ACD), through a public telephone network. Once the call is received, the originating telephonic switch logically determines how the call is to be routed. The call is often directed to an agent associated with the originating telephonic switch to service the call. However, in many situations it may be necessary for the call must to be transferred or overflowed to an agent at another telephonic switch in the telephonic switch network. For example, the number of incoming telephone calls to the originating telephonic switch may exceed the call capacity of the originating telephonic switch and thereby require the call to be overflowed to another telephonic switch in the network.

It is known to transfer a call from one ACD to another ACD through the regular public external telephonic network. Such a system is disclosed in commonly assigned U.S. Pat. No. 5,384,841 issued to Adams et al., entitled "Automatic Call Distribution Network With Call Overload System and Method" and issued on Jan. 24, 1995, the disclosure of which is hereby incorporated by reference. The Adams et al. invention increased the amount of information sent with the overflowed call. The additional information could then be advantageously used by the destination ACD, or the agent at the destination ACD. Although the Adams et al. invention is a significant improvement over prior systems, systems which provide even more information to the destination ACD, or destination telephonic switch, are desired in the art.

For example, telephonic switches are increasingly obtaining information from the caller which is subsequently used in handling the call. Typically, a voice response unit (VRU) audibly requests information, such as an identification number, from the caller. Prior systems unfortunately do not transfer information provided by the caller to the destination telephonic switch. Thus, an agent, or VRU, at the destination telephonic switch must again request the information.

Therefore, these known systems are limited by the restricted amount of information transferred to the destination telephonic switch, thereby reducing the amount of routing and application features available in such a telephonic switch network with overflow capability.

Accordingly, there is a need in the art for a call overflow system and method wherein information provided by the caller is transmitted from an originating telephonic switch to a destination telephonic switch.

SUMMARY OF THE INVENTION

This need is met by a call overflow system and method for overflowing a telephone call from an originating telephonic switch to a destination telephonic switch in accordance with the present invention wherein the originating telephonic switch transmits information gathered from the caller to the destination telephonic switch. The destination telephonic switch thereafter advantageously uses the information to accept or decline the overflowed telephone and, if accepted, to route the overflowed telephone call to an agent.

In accordance with one aspect of the present invention, a call overflow system for overflowing a telephone call from an originating telephonic switch to a destination telephonic switch is provided. The system comprises collecting means, such as a voice response unit, associated with the originating telephonic switch for collecting information from a caller. Sending means sends the information from the originating telephonic switch to the destination telephonic switch. Transferring means then transfers the telephone call from the originating telephonic switch to the destination telephonic switch based on the information.

Preferably, the call overflow system further comprises compiling means associated with the originating telephonic switch for compiling data relating to the telephone call, the data including the information supplied by the caller. The compiling means may compile data relating to a number of times the telephone call was transferred, data relating to identification of a dialed number identification service associated with the telephone call, data relating to identification of the originating telephonic switch, data relating to identification of a call sequence number uniquely identifying the telephone call, data relating to a time the telephone call spent at the originating telephonic switch, data relating to routing information for routing the telephone call at the destination telephonic switch and data relating to an application number identifying which application is to route the telephone call at the destination telephonic switch.

In accordance with another aspect of the present invention, a method for overflowing a telephone call made by a caller from an originating telephonic switch to a destination telephonic switch comprises the steps of: collecting information obtained from the caller; sending the information to the destination telephonic switch; and transferring the telephone call to the destination telephonic switch. Preferably, the method further comprises the step of compiling data relating to the telephone call, the data including the information supplied by the caller. The step of collecting information may comprise the step of audibly prompting the caller for the information.

These and other features and advantages of the present invention will become apparent from the following detailed description, the accompanying drawings and the appended claims.

BRIEF DESCRIPTION OF THE DRAWINGS

FIG. 1 is a schematic block diagram showing a call overflow system in accordance with the present invention which comprises an originating ACD and a destination ACD; and FIGS. 2A and 2B show the format of an information element data packet in accordance with the present invention which is sent from the originating ACD and the destination ACD shown in FIG. 1.

DETAILED DESCRIPTION OF THE INVENTION

Figure 2B:
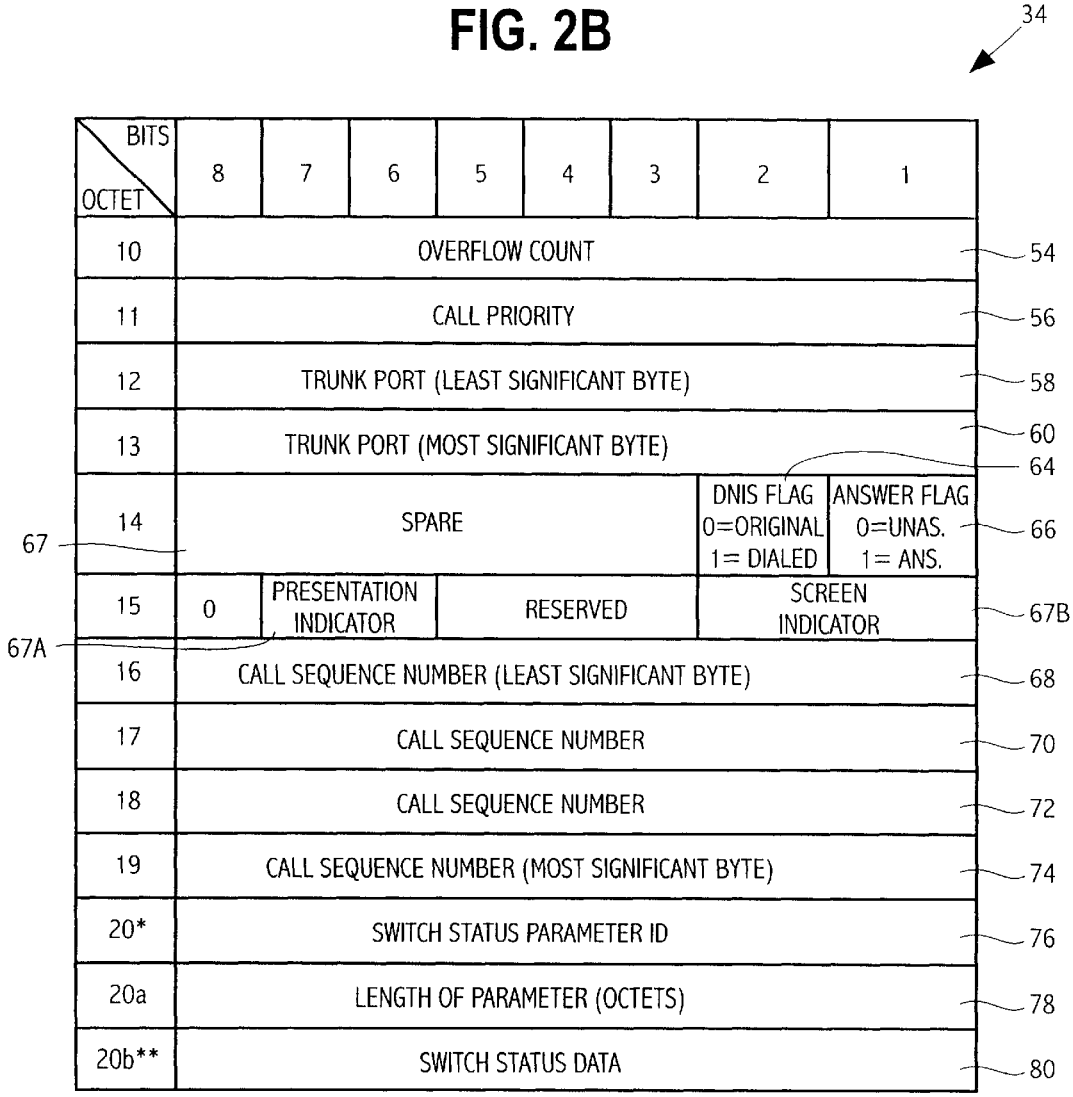

A call overflow system 10 is shown in FIG. 1 comprising an originating telephonic switch, such as an originating automatic call distributor (ACD) 12A, a destination telephonic switch, such as a destination ACD 12B, and another telephonic switch, such as an ACD 12C. The originating ACD 12A has a multiport switch 14A controlled by a central processing unit (CPU) 16A in conjunction with a memory 18A for distributing telephonic calls to internal telephonic units 20A via ports 26A. As those skilled in the art will readily comprehend, the ports 26A may be designated as gates, I/O devices or other input/output interfaces. The CPU 16A working in conjunction with the memory 18A comprises compiling means for compiling data relating to telephone calls received at the originating ACD 12A.

The telephonic calls may be received from caller telephonic units 22 through a telephonic network 24. The originating ACD 12A receives a telephone call from a caller at one of the caller telephonic units 22. The call is routed to an agent stationed at one of the internal telephonic units 20A in accordance with software applications executed by the CPU 16A. Typically, the software applications are stored in the memory 18A To distribute calls received from the telephonic units 22 as evenly and efficiently as possible, the originating ACD 12A transfers or overflows received calls through the telephonic network 24 upon meeting a specified overflow criteria (i.e. call is idle for predetermined period of time, all internal telephonic units for a particular port are busy and such) to the destination ACD 12B in the call overflow system 10. The multiport switch 14A, CPU 16A and memory 18A comprise sending means for sending the data from the originating ACD 12A to the destination ACD 12B.

A voice response unit (VRU) 25 provides audio prompts to the caller requesting information. The caller typically responds by dialing the appropriate numbers. A number of VRUs are known in the art. Since the structure and philosophy of the VRU 25 are not important to the present invention beyond the generation of audio prompts, details of such systems will not be ether disclosed herein. The VRU 25, the CPUs 16A, 16B and 16C comprise, in part, collecting means for collecting information from the caller.

The destination ACD 12B receives the overflow call sent from the originating ACD 12A via the network 24 at a multiport switch 14B which is controlled by a CPU 16B in conjunction with a memory 18B. The destination ACD 12B then routes the telephone call to one or more agents located at internal telephonic units 20B via ports 263. The routing of the telephone call at the destination ACD 12B is performed in accordance with software applications executed by the CPU 16B. Agents stationed at the internal telephonic units 20B of the destination ACD 12B may service the received call. If the transferred call is not accepted at the destination ACD 12B, then the originating ACD 12A alternatively transfers the call to another ACD 12C specified by a system administrator at a system administration unit 21A. A host computer 23 provides selected stored information to any and all of the ACDs 12A, 12B and 12C.

While the overflow system 10 of the present invention can be implemented in a number of types of telephonic switching networks having a plurality of telephonic switches, it is preferably employed in an telephonic switching network having automatic call distributors of the type shown in U.S. Pat. No. 5,268,903 issued to Jones et al. on Dec. 7, 1993 entitled "Multichannel Telephonic Switching Network With Different Signaling Formats and Connect/PBX Treatment Selectable For Each Channel"; U.S. Pat. No. 4,627,047 to Pitroda et al., entitled "Integrated Voice and Data Telecommunications Switching System", issued Dec. 2, 1986; U.S. Pat. No. 5,469,504 to Blaha, entitled "Automatic Call Distributor With Intersubnetwork Customer Information Transfer System and Method", issued Nov. 21, 1995; and U.S. Pat. No. 5,384,841 to Adams et al., entitled "Automatic Call Distribution Network With Call System and Method", issued Jan. 24, 1995, the disclosures of which are hereby incorporated by reference.

The CPU 16A of the originating ACD 12A compiles data in an information element data packet 34, shown in FIGS. 2A and 2B, which is sent to the destination ACD 12B. The data may be, although not necessarily, sent substantially simultaneously with the overflow call to the destination ACD 12B. The data contained in the information element data packet 34 enables the destination ACID 12B to efficiently route the overflow call and provides information to trigger the CPU 12B to perform various functions at the destination ACD 12B, such as announcements of agents, announcements to customers, screen displays of data, prioritization of call routing and network call handling reports.

The transferring of an overflow call and the data in the information element data packet 34 in the present invention may be advantageously employed in an Integrated Services Digital Network (ISDN) environment. The format of the preferred information element data packet 34 is shown with the call information carried on the ISDN "D" channel in response to the sending or overflowing of a telephone call from the originating ACD 12A to the destination ACD 12B.

The information element data packet 34 is a variable length byte data packet having eight bits per byte. The information element data packet 34 may be included as part of a SETUP message when an overflow call is initiated between the originating multiport switch 14A and the destination multiport switch 14B. The information element data packet 34 contains information which the destination ACD 12B uses to route the call, to determine acceptance of the call and to trigger the sending of data to internal telephonic units 12B servicing the overflow call.

Information identifying the information element data packet 34 is contained in a user-to-user identifier element 36 (byte one). The information in the element 36 identifies to the CPU 16B of the destination ACD 12B that the received data packet is an ISDN user-to-user information element data packet 34. The user-to-user identifier element 36 further informs the telephonic network 24 that the data contained in the information element data packet 34 concerns the network 10 and, therefore, the telephonic network 24 should send the information element data packet 34 to the destination ACD 12B.

Length of User-to-User Identifier Element 38 (byte two) contains the length of the information element data packet 34. An ISDN overflow identifier 40 is in byte three. A destination application number 42, or gate number, identifies a specific application for processing the call at the destination ACD 12B. Alternatively, if no application number is specified in byte four 42, the destination ACI) 12B routes the received overflow call as it normally routes telephone calls from the telephonic network 24. The routing of an overflow telephone call not containing information relating to the identification of a selected application in byte four 42 of the information element data packet 34 may be based on commonly known Digital Number Identification Service (DNIS) digits, Automatic Number Identification (ANI) digits or a default application at the destination ACD 12B. The system administration unit 21A may selectively allow or prevent the sending of data identifying a selected application 26B in byte four 42.

The longest delay time for all calls in queue for the application to which the overflowed call is queued at the originating telephonic switch 12A is contained in bytes five 44 and six 45. The longest delay time is contained in the information element data packet 34 to the destination ACD 12B. Preferably, the CPU 16B at the destination ACD 12B routes calls having a longer delay time in queue to the internal telephonic unit 20B before another call having a shorter delay time.

Various types of telephonic calls, such as 1-900 and 1-800 or toll-free calls, received from the external telephonic units 22 frequently are assigned call type identification signals which are transferred to the originating ACD 12A. These call type identification signals preferably are DNIS digits or ANI digits which are associated with different types of calls. Specifically, it is common practice for a long distance telephone carrier company of the telephonic network 24 to assign DNIS digits or ANT digits associated with different types of telephonic calls. Examples of such long distance carrier companies are American Telephone and Telegraph Co., MCI, Sprint and the like. The DNIS digits, ANI digits, or both, are carried concurrently with the telephonic call from the telephonic network 24 to the originating ACD 12A. The DNIS digits, ANI digits, or both, are further transferred from the originating ACD 12A originally receiving the call to the destination ACD 12B.

A total number of DNIS digits included in the information element data packet 34 is contained in byte seven 46. The transmitted DNIS digits are representative of the telephone number dialed by the caller. The actual DNIS digits are contained in bytes 7a and 7b which are divided into four DNIS BCD digits 46a, 46b, 46c and 46d. Although only four DNIS digits 46a, 46b, 46c and 46d are shown, any number of DNIS digits may be employed in the present invention. Since the number of DNIS digits may vary from call to call, the present invention has the flexibility to handle the DNIS digits of a number of call types.

Byte eight 48 of the information element data packet 34 contains the total number of ANI digits associated with the overflow telephone call. Bytes 8a through 8e, designated by reference numerals 50a through 50j, contain the ANI digits which represent the telephone number of the telephonic unit 22 generating the telephone call received at the originating ACD 12A and transferred as the overflow telephone call to the destination ACD 12B. The ANI digits 50a through 50j are carried in the information element data packet 34 which is received at the destination switch 14B. The CPU 16B at the destination ACD 12B selectively uses the ANI information for executing software applications to route the received overflow telephone call to one of the telephonic units 20B to service the call. The ANI information received at the destination ACD 12B also triggers the CPU16B to send information and execute various applications at the telephonic units 20B. These applications include, but are not limited to, the playing of personal announcements, displaying data regarding the call and playing recorded messages to callers.

Information regarding the identification of the site of the originating ACD 12A is contained in byte nine 52 of the information element data packet 34, as shown in FIG. 2B. In response to receipt of the originating ACD site identification data 52, the CPU 16B of the destination ACD 121 determines the origin of the received overflow call. The originating ACD site information 52 is used by the CPU 16B of the destination ACD 12B to track data relating to the call received at the originating ACD 12A The information 52 identifying the originating ACD 12A is particularly useful in the system 10 in which data is accessed from a common data base stored in the host computer 23.

Byte ten 54 of the information element data packet 34 includes an overflow count indicting a number of times a call has been overflowed between ACDs. Each CPU 16A, 16B and 16C, for example, may increase the value contained in byte ten 54 when a call is transferred. In addition, the destination ACD 12B, and in particular CPU 16B, may include overflow means for establishing a maximum overflow value, for comparing the maximum overflow value to the number of times the call has been overflowed and for prohibiting further transfer of the call when the number of times the call has been transferred equals, or exceeds, the maximum overflow value. This reduces the likelihood that a call would be repeatedly transferred, or overflowed, between two or more ACDs.

Byte eleven 56 contains information regarding the priority of the overflow call. Calls from the telephonic units 22 of the network 24 received at the originating ACD 12A are categorized into different priority levels The system administrator at the system administration unit 21A inserts into the memory 18A of the originating ACD 12A the various priority levels for various calls received at the switch 14A. Preferably, calls assigned to higher priority levels are routed to internal telephonic units sooner than calls having a lower priority level. The priority level assigned to a particular call is inserted into byte eleven 56 of the information element data packet 34 in response to the call being overflowed to the destination ACD 12B. The assigned priority level 56 of the overflow call informs the destination ACD 12B of the categorized priority level of the call. The CPU 16B places the received call in the appropriate level within a queue to properly service the overflow call at the destination ACD 12B.

The implementation of ISDN standards ensures the sending of telephonic calls with associated call information between multiple ACDs 12A, 12B and 12C using PRI D-channels and B-channels through the telephonic network 24. This provides for a call overflow system 32 without the cost of dedicated D-channels and B-channels over tie lines between the call distributors. The use of ISDN messages to overflow a call allows specific information associated with the call to be sent from the originating ACD 12A to the destination ACD 12B.

A number of a trunk over which a call was received at the originating ACD 12A is contained in bytes twelve 58 and thirteen 60. Byte fourteen contains two types of information. Element 64 of byte fourteen provides information indicating whether the DNIS numbers discussed above were original DNIS numbers representative of the telephone number dialed by a caller or DNIS numbers representative of the number dialed by the originating ACD 12A to transfer the call. Thus, DNIS numbers representative of either the telephone number dialed by the caller or the originating ACD 12A may be advantageously employed in the present invention. Either of the DNIS numbers may be used to identity the call as the call is transferred throughout the system 10.

Element 66 of byte fourteen contains information indicating whether a (tall was previously answered and then transferred or the call was transferred without being answered. If the call was previously answered, the agent who initially handled the call may have obtained information from the caller which is stored in the host computer 23, the CPU 16A or any other electronic memory device. Element 66 would then indicate that the call was answered and that additional information may be stored in the system 10.

Byte fifteen contains information which indicates whether the caller has attempted to block a caller identification (caller ID) process. As is well known, the caller ID process transmits the caller's telephone number to the called party. Using the caller's telephone number, the originating ACD 12A may automatically retrieve data relating to the caller, such as the caller's name, address and the like, from the host computer 23 or other memory and present this data to an agent answering the call. Methods, such as dialing a specified sequence of numbers, are available for callers to block the caller ID process. However, this blocking technique does not operate to block transmission of the caller's telephone number if the caller is calling, for example, a toll free number.

In prior systems, an agent unfortunately would not know whether the caller attempted to block the caller ID process. Consequently, the caller may be somewhat surprised, and even angry, when the agent recites the caller's name and address without being told this information. The present invention obviates this problem by displaying a message to the agent, in response to the information contained in field 70, that the caller has attempted to block the caller ID process. The agent is then able to handle the call without devolving that the caller's name and address are already known.

Byte fifteen comprises a presentation indicator 67a and a screen indicator 67b. The presentation indicator 67a indicates whether an attempt was made to block the caller ID process. The screen indicator 67b indicates who provided the caller ID information and whether the network verified the caller ID information. Accordingly, the system 10 indicates to an agent whether the caller has attempted to block the caller ID process based on the presentation and screen indicators 67a and 67b. Bytes fifteen through nineteen 68, 70, 72, and 74 contain a call sequence number which is assigned to a call by the originating ACD 12A. The call sequence number and the site identification number 52 of a call may be used to identify the call throughout the system 10.

Byte twenty 76 contains a switch status parameter identifier for identifying the type of caller, or subscriber, information which is to follow. The number of bytes of subscriber information which is to follow is contained in byte twenty (a) 78. The actual subscriber information is transmitted in byte twenty (b) 80. Although only byte twenty (b) 80 is shown, any number of bytes may be implemented. The subscriber information digits or information collected from the caller, such as an account number. The destination ACD 12B uses this subscriber information to efficiently and quickly service the overflowed telephone call, such as to request routing instructions from the host computer 23 or to provide the subscriber information to the VRU 25 or internal telephonic unit 20B.

In operation, a telephone call is received at the multiport switch 14A of the originating ACD 12A from the caller telephonic unit 22 through the telephonic network 24. The memory 18A of the CPU 16A contains the predetermined criteria used for determining whether the telephone call creates an overflow condition. Preferably if the overflow condition exists, an ISDN route is used to select an idle ISDN B-channel utilizing a T-1 span line 28 to carry the call through the telephonic network 24. The CPU 16A of the originating ACD 12A allocates an ISDN B-channel on the T-1 span line 28 for the transferring of the overflow call to the destination ACD 12B. The call received at the originating multiport switch 14A is selected for overflow to the destination multiport switch 14B of the destination ACD 12B.

Once an ISDN B-channel is selected for overflow and the received telephone call at the originating ACD 12A awaiting answer by the telephonic unit 20A is selected for overflow service, the originating ACD 12A sends a message, such as a SETUP message, over a D-channel across T-1 span line 28 to the telephonic network 24 and through trunk line T-1 span line 30 to the destination ACD 12B. Preferably, calls may be handled by various devices such as agent telephonic units in which agents service received calls, voice response units, automatic response units and private branch exchanges. The SETUP message is an ISDN layer three message used to indicate call establishment. The SETUP message contains the information element data packet 34 which provides the specific call routing and feature triggering information associated with the overflow call to the destination ACD 12B. A detailed description of the procedure for routing an overflow call at the destination ACD 12B may be found in U.S. Pat. No. 5,384,841, the disclosure of which has been incorporated by reference. Since the structure and philosophy of routing the call at the destination ACD 12B are not important to the present invention beyond the utilization of the information provided to the destination ACD as described herein, this routing will not be further discussed.

While the advantages of the invention are preferably obtained in the system 10 described above with reference to FIG. 1, the method can be practiced with any other networks having transferring means for transferring a call received at an originating ACD 12A to a destination ACD 12B through a telephonic network 24. For example, those skilled in the art will be able to readily implement the present invention in other telephone switching systems, such as a digital private network signaling system (DPNSS).

The structure, control and arrangement of these conventional components and circuits have, for the most part, been illustrated in the drawings by readily understandable block representations and schematic diagrams, which show only those specific details that are pertinent to the present invention, in order not to obscure the disclosure with structural details which will be readily apparent to those skilled in the art having the benefit of the description herein.

Having thus described the invention in detail by way of reference to preferred embodiments thereof, it will be apparent that other modifications and variations are possible without departing from the scope of the invention defined in the appended claims. Therefore, the spirit and scope of the appended claims should not be limited to the description of the preferred versions contained herein.

What is claimed is:

1. A call overflow system for overflowing a telephone call form an originating telephone switch to a destination telephonic switch, the telephone call being made by a caller, the system comprising:

collecting means associated with the originating telephonic switch for collecting information from the caller through a voice channel of the telephone call;

means for compiling the information collected on the voice channel from the caller into a data packet;

sending means for sending the data packet directly from the originating telephonic switch to the destination telephonic switch wherein said information includes a caller ID blocking message if said message exists; and transferring means for transferring the telephone call from the originating telephonic switch to the destination telephonic switch based on the information.

2. The call overflow system as recited in claim 1 comprising:

compiling means associated with the originating telephonic switch for compiling data relating to the telephone call, the data including the information supplied by the caller; and wherein the sending means sends the data to the destination telephonic switch, and wherein the transferring means transfers the telephone call based on the data.

3. The call overflow system as recited in claim 2 wherein the compiling means comprises means for compiling data relating to a number of times the telephone call was transferred.

4. The call overflow system as recited in claim 2 wherein the compiling means comprises means for compiling data relating to identification of a dialed number identification service associated with the telephone call.

5. The call overflow system as recited in claim 2 wherein the compiling means comprises means for compiling data relating to identification of the originating telephonic switch.

6. The call overflow system as recited in claim 2 wherein the compiling means comprises means for compiling data relating to identification of a call sequence number uniquely identifying the telephone call.

7. The call overflow system as recited in claim 2 wherein the compiling means comprises means for compiling data relating to a time the telephone call spent at the originating telephonic switch.

8. The call overflow system as recited in claim 2 wherein the compiling means comprises means for compiling data relating to routing information for routing the telephone call at the destination telephonic switch.

9. The call overflow system as recited in claim 8 wherein the compiling means comprises means for compiling data relating to an application number identifying which application is to route the telephone call at the destination telephonic switch.

10. The call overflow system as recited in claim 1 wherein the collecting means comprises a voice response unit for prompting the caller for at least a portion of the information.

11. The call overflow system as recited in claim 1 wherein the sending means comprises means for sending the information in integrated services digital network format to the destination switch.

12. The call overflow system as recited in claim 1 wherein the sending means comprises means for sending the information over a public telephonic network to the destination telephonic switch.

13. The call overflow system as recited as in claim 1 comprising means for routing the telephone call to agent based upon the information.

14. A method for overflowing a telephone call made by a caller from an originating telephonic switch to a destination telephonic switch comprising the steps of:

collecting information from the caller through a voice channel of the telephone call;

sending the information directly from the originating telephonic switch to the destination telephonic switch wherein said information includes a caller ID blocking message if said message exists; and transferring the telephone call to the destination switch.

15. The method as recited in claim 14 comprising the step of:

compiling data relating to the telephone call, the data including the information supplied by the caller; and wherein the step of sending comprises the step of:

sending the data to the destination telephonic switch.

16. The method as recited in claim 15 wherein the step of compiling data comprises the step of:

compiling data relating to a number of times the telephone call was transferred.

17. The method as recited in claim 15 wherein the step of compiling data comprises the step of:

compiling data relating to identification of the originating telephonic switch.

18. The method as recited in claim 15 wherein the step of compiling data comprises the step of:

compiling data relating to identification of a call sequence number uniquely identifying the telephone call.

19. The method as recited in claim 15 wherein the step of compiling data comprises the step of:

compiling data relating to a time the telephone call spent at the originating telephonic switch.

20. The method as recited in claim 15 wherein the step of compiling data comprises the step of:

compiling data relating to routing information for routing the telephone call at the destination telephonic switch.

21. The method as recited in claim 14 wherein the step of collecting information comprises the step of:

audibly prompting the caller for the information.

22. The method of overflowing the telephone call as in claim 14 further comprising routing the transferred call to an agent based upon the information.

* * * * *